(No Model.) 4 Sheets—Sheet 1.

F. J. SPRAGUE.
ELECTRIC RAILWAY.

No. 317,235. Patented May 5, 1885.

ATTEST:
E. C. Rowland
J. G. Greene Jr.

INVENTOR:
Frank J. Sprague
By Dyer & Seely
attys

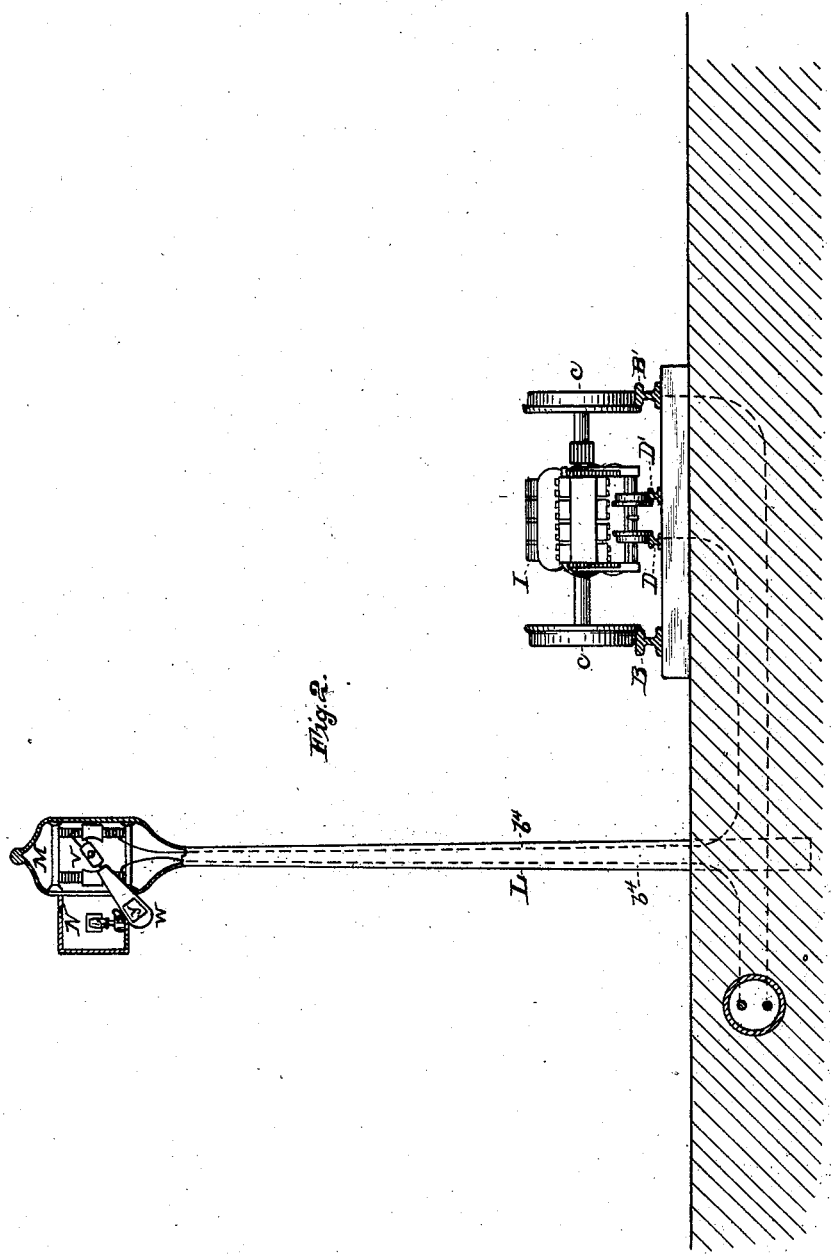

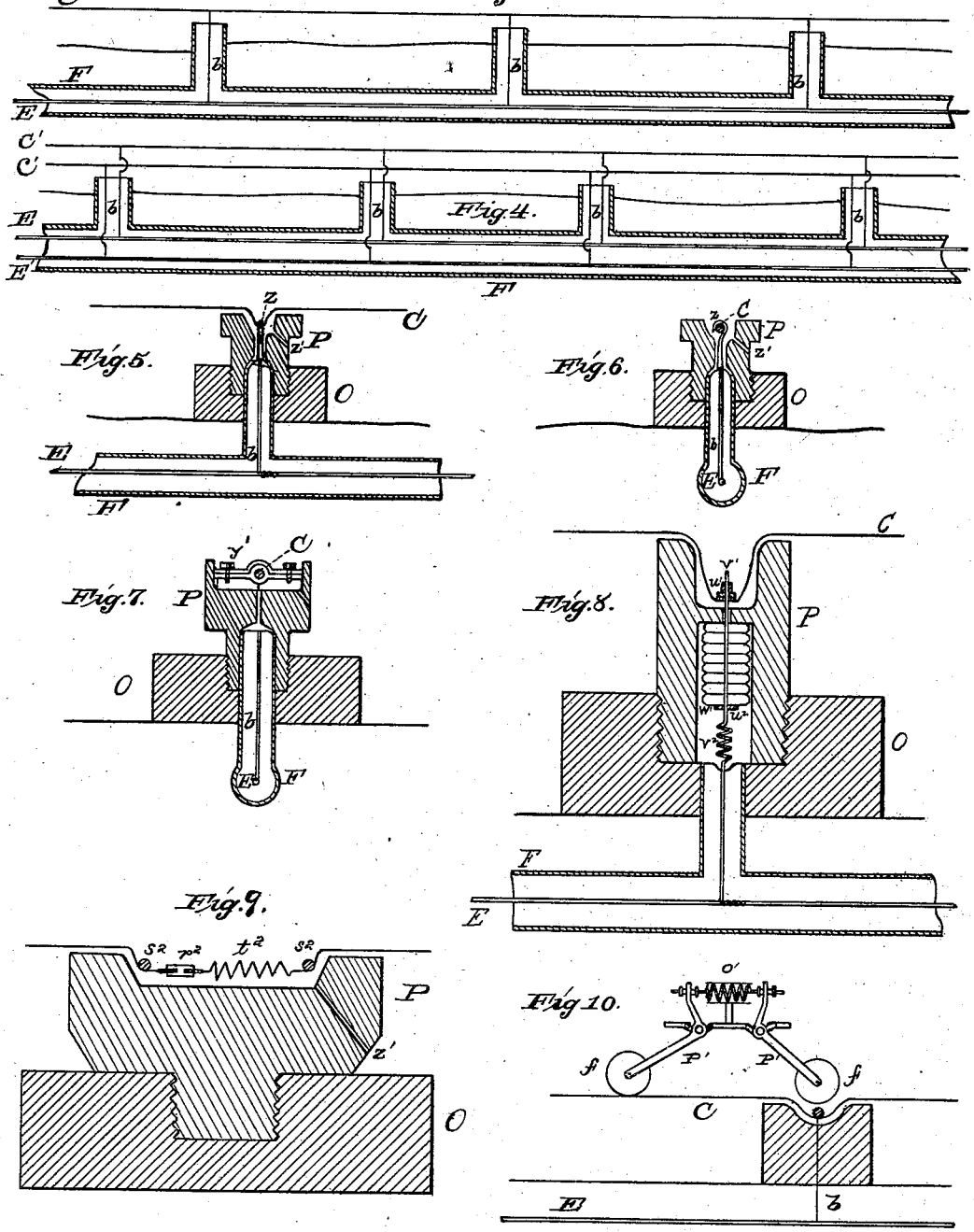

(No Model.)
F. J. SPRAGUE.
ELECTRIC RAILWAY.
No. 317,235. Patented May 5, 1885.
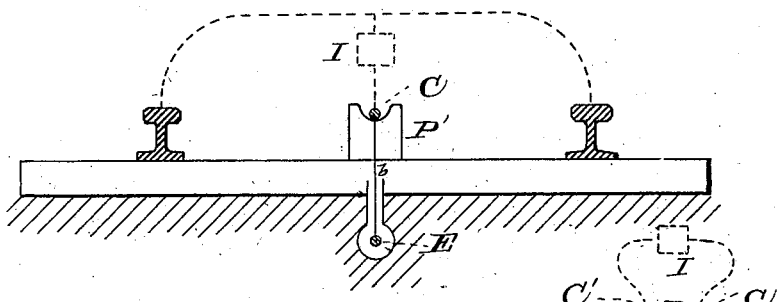
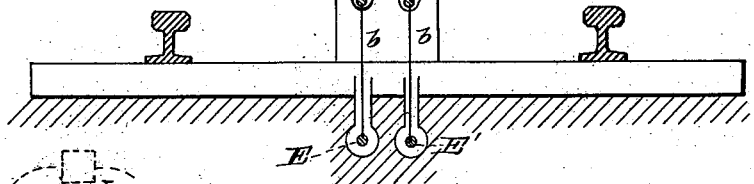
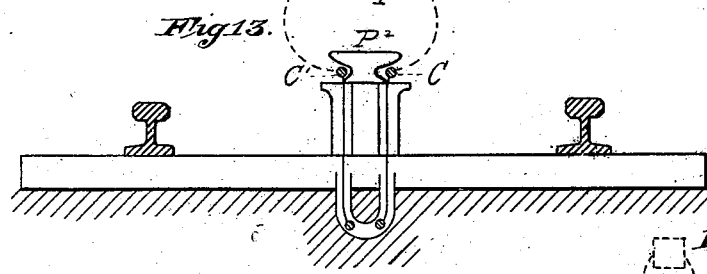
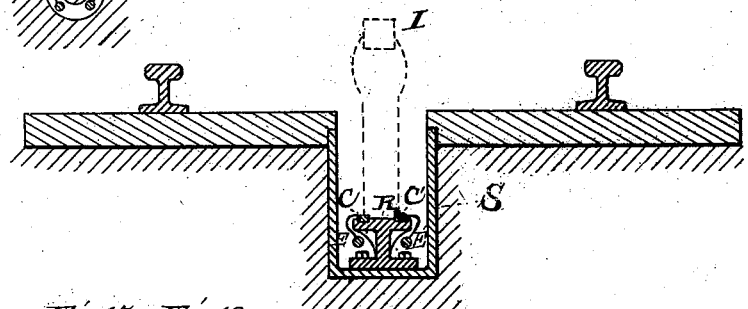
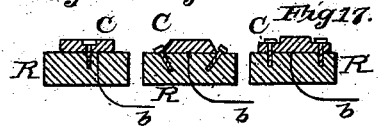
ATTEST:
E. C. Rowland.
J. G. Greene Jr.
INVENTOR:
Frank J. Sprague
By Dyer & Seely
Att'ys

UNITED STATES PATENT OFFICE.

FRANK J. SPRAGUE, OF NORTH ADAMS, MASSACHUSETTS, ASSIGNOR TO THE SPRAGUE ELECTRIC RAILWAY AND MOTOR COMPANY.

ELECTRIC RAILWAY.

SPECIFICATION forming part of Letters Patent No. 317,235, dated May 5, 1885.

Application filed April 14, 1882. (No model.)

*To all whom it may concern:*

Be it known that I, FRANK J. SPRAGUE, of North Adams, in the county of Berkshire and State of Massachusetts, have invented a certain new and useful Improvement in Electric-Railway Systems, of which the following is a specification.

The object of my invention is to produce an economical and efficient system for utilizing electricity as the motive power in railways; and my invention consists in the various novel arrangements and devices employed by me in accomplishing the above-named object, as hereinafter described and claimed.

In carrying out my invention I provide, first, one or more main conductors, preferably of low resistance, which may be carried on poles placed in pipes, buried under ground, carried on or under the ties, or placed and protected in any other suitable manner; but preferably they are placed in pipes or tubes under ground. The electric motors which run on the railway do not take their current directly from these main conductors, as has heretofore been customary; but such conductors are connected at intervals with others, which I term "working-conductors," and from which the current is taken. These working-conductors may be continuous, but for lines of any length I prefer to divide them into regular sections. The conductors are insulated from the earth and from other line-connections, and may be placed in any suitable position to be in connection with the motors. I prefer to employ central rails placed between the rails of the track, though in some cases the conductors may be wires or bars placed in a trench between the rails; or wires placed upon poles may be used; also, in some cases the rails of the track form one side of the working-circuit.

The different methods of arranging and connecting the two sets of conductors will be more specifically hereinafter described. By this arrangement I provide a path of low resistance for the main current, and a conductor therefor which is not subject to the wear and tear of the moving contact with the motors, on which, owing to the low resistance, there will be little loss from leakage, and which, if the working-conductor is damaged or broken at any point, still maintains an unbroken circuit to the rest of the line. Further, the amount of the working-conductor's resistance in circuit at any time is never more than that of one of its sections.

To supply the main conductors with current, I prefer to connect several generators or several series of generators at different points along the line, so as to maintain an equality of load and the same potential at all the generator-terminals wherever the motors may be on the line, by which arrangement the most efficient work is obtained. For each section of the working-conductor I provide an electrically-operated signaling device placed preferably in the branch which connects such section with the main conductors. When circuit is closed in a section by the entrance upon it of a motor, such signaling device is put in operation. I prefer to use a visual signal, though a continuously-ringing bell may be employed. The signal indicates to a following or oppositely approaching train that the section is already occupied. If wires are used for the working-conductors, I provide means for maintaining a normal degree of mechanical tension upon such conductors. For this purpose adjustable springs or equivalent devices are connected with the working-conductor at different points, such springs being placed out of the line of continuity of the conductor. If from heat or other cause the wire tends to become slack, the springs automatically tighten it. In taking the current from the working-conductors I prefer to use two or more current-collectors, such as rollers, springs, or brushes placed one behind another, and connected with the same terminal of the motor, so as to afford continuous contact in passing over a break or depression in a working-conductor or in the rails when they are used as the return-circuit. I provide in connection with a motor suitable regulating and circuit-controlling devices, as will be set forth.

My invention may be more readily understood by reference to the accompanying drawings, in which—

Figure 1 is a partial plan view and partial diagram representing an electric-railway system embodying the principal features of my invention. Fig. 2 represents a cross-section of the track with the motor and signal device in elevation. Figs. 3 and 4 are diagrams illustrating other arrangements of the circuits. Figs. 5, 6, 7, 8, and 9 represent different modes of connecting and supporting working-conductors. Fig. 10 illustrates an arrangement of the current-collecting rollers which may be employed. Figs. 11, 12, 13, and 14 illustrate, partly in diagram, different arrangements of the main and working conductors. Figs. 15, 16, and 17 are sections of working-conductors which may be used.

Referring first to Figs. 1 and 2, A A' are the rails of one track, and B B' those of the other, in a double-track-railway system. Each track has two central rails—in one case C and C', in the other D and D'.

E E' represent main conductors placed in a tube, F, which is preferably buried in the ground between the tracks, as shown, or in any other convenient situation.

G and G' represent each a generator or a series or group of generators connected at different points to the main conductors by conductors H H'.

I and I' are the motors, which travel upon the rails.

In the two tracks of Fig. 1 I have shown somewhat different arrangements of circuits. I will first describe the track A A'. The central rails, C C', each form one of the working-conductors, and they are divided into sections 1, 2, and 3, of suitable length, by interposed insulations $a$ $a$. From the main conductor E a branch conductor, $b$, (or $b'$ $b^2$, &c.,) extends to each section of the working-conductor C', and from main conductor E' a similar branch conductor extends to each section of working-conductor C. While the branches $b$ $b$, &c., are connected to the working-conductors preferably at or near the ends of the sections, they are preferably taken from the main conductors at points somewhat distant, and at such points are located signaling devices K or K', which are arbitrarily represented in Fig. 1, but will be presently described in detail. The signals K are set, while signals K' are down. The motor I is mounted upon a car having wheels $c$ $c$, and its armature $d$ is preferably placed directly upon the driving-axle. Frames $e$ $e'$, extending from either end of the motor, carry rollers $f f$ and $f' f'$, which run on the working-conductors C C'. Rollers $f$ and $f'$ are separated by insulation $g$. Rollers $f f$ form one terminal, and are so far apart that any break in the working-conductors is bridged by them, and $f' f'$ similarly form the other terminal. Flat springs $h$ $h$ or other suitable tension devices may be employed to maintain the contact of the rollers with the working-conductors. The motor is preferably a shunt-wound electro-dynamic motor, the armature-circuit terminals being at $m$ $m'$, and the field-circuit terminals at $n$ $n'$.

A circuit breaker and reverser, $o$, is in the armature-circuit, and an adjustable resistance, $p$, in the field-circuit; or other suitable field-regulating means may be substituted for the resistance.

The motor being on section 1, as shown, the circuits to and through it are as follows: from generators G and G' by wires H to main conductor E; thence by branch wire $b$ through a signal, K, to working-conductor C', from which the current is taken by rollers $f' f'$, from the axles of the rollers to wire $r$, which is connected to stationary split collars $s$ $s$ on the axles; thence through the field and armature of the motor to wire $r$, rollers $f f$, and working-conductor C, branch conductor $b'$, and through another signal, K, back to conductor E', this connection not being shown in the drawings, owing to lack of space; thence by H' H' to the generators. Signals are thus set midway or at other convenient points of the adjacent sections, showing the presence of a motor on section 1. If the train is on section 2, branch conductors $b^2$ and $b^3$ are in circuit, and other signals are set, as will be well understood.

The branch conductors may include safety-catches or fusible lengths of wire to guard the system in case of a short circuit occurring, and, if desired, hand-switches may also be placed in such conductors, so that a section may at any time be cut out of circuit, if necessary.

In the arrangement of track B B' the two central rails form together a single working-conductor, the main or traffic rails forming the other side of the working-circuits, and being connected to the main by branch conductors. In the motor, rollers $t$ $t$ form one terminal and rollers $t'$ $t'$ the other, there being no insulating-section in the axles. The single working-conductor is divided into sections, as before. It is evident that a single line of rails may be used as this working-conductor; but two rails give lower resistance and better contact for the motor, and enable better signaling to be done than if one is used.

The motor being on section 2, the circuit is as follows from the main conductors: by branches $b^4$ $b^4$ from main conductor E' to the working-conductor, setting the signals in those branches; thence to the field and armature of the motor; thence by wire $u$ to the axles; thence to the rails, and by branch conductor $b^5$ to main conductor E.

The track B B' is shown in section in Fig. 2.

L is a signal-pole. A conductor, $b^4$, (shown in dotted lines,) extends to said signal-pole and to the magnet-coils of the small electro-magnetic device M, placed in a suitable box at the top of the pole. The polarized armature $v$ of this apparatus carries a signal-arm, $w$. When the magnets of M are energized by the passage of a train upon the section adjacent to that upon which the signal is placed, (for, as seen in Fig. 1, the branch conductors extend a suitable distance along the section,) the signal-arm is raised, and in the daytime indicates the presence of the train. At night the lamp N is used, the signal-arm having a square of suitably-colored glass, $y$, which, when the arm is raised, comes before the lamp, while, when the arm is lowered, a white light, or one of another color, is shown. This signaling device is shown as a typical form.

It is evident that any electrically-operated signaling apparatus may be used. If wires are used as the working-conductors, the signaling devices may be placed directly therein, instead of in the branches. In any case, however, the signals are placed in the working-circuits, which consist of the working-conductors and the branch conductors; or they may be placed in a shunt from one of said conductors, which is, of course, equivalent to placing them directly therein. In some cases—on short lines, for instance—it may be desirable to employ continuous or undivided working-conductors connected at intervals with the main conductors. In Fig. 3 such an arrangement is shown in diagram, where there is a single main conductor, E, placed in a pipe, F, and a single working-conductor, C, and branch conductors $bb$ connecting them. The main rails or the earth, or both, are used for the return-circuit in this arrangement, as will be readily understood.

In Fig. 4 there are complete metallic circuits, there being two working-conductors, C C', and two main conductors, E E'. It is evident that the working conductor or conductors in both these instances may be a central rail or rails, or may be otherwise constructed and situated, as has been set forth.

I desire to support and connect the working-conductors in such manner that the connecting and supporting devices will not interfere with the contact of the motor. Figs. 5 and 6 are opposite vertical sections of an arrangement for this purpose which may be employed when wire is used for the conductors.

E is a main conductor in tube F. O is a cross-tie or sleeper; P, a block of glass or other insulating material, supported thereon and having a depression in its top in which the working-conductor C is bent down. Branch conductor $b$ terminates in a hook, $z$, which passes over conductor C and holds it, making good connection between the conductors. $z'$ is an outlet for water which may gather in the depression.

Fig. 7 is a vertical transverse section of another arrangement, in which the working-conductor C, bent down within P, is held by a clamp, $y'$, with which branch $b$ is connected. It is evident that with any of these arrangements two working-conductors may be in the same way connected with two main conductors.

Figs. 8 and 9 illustrate adjustable tension devices for a working-conductor.

Figure 1:
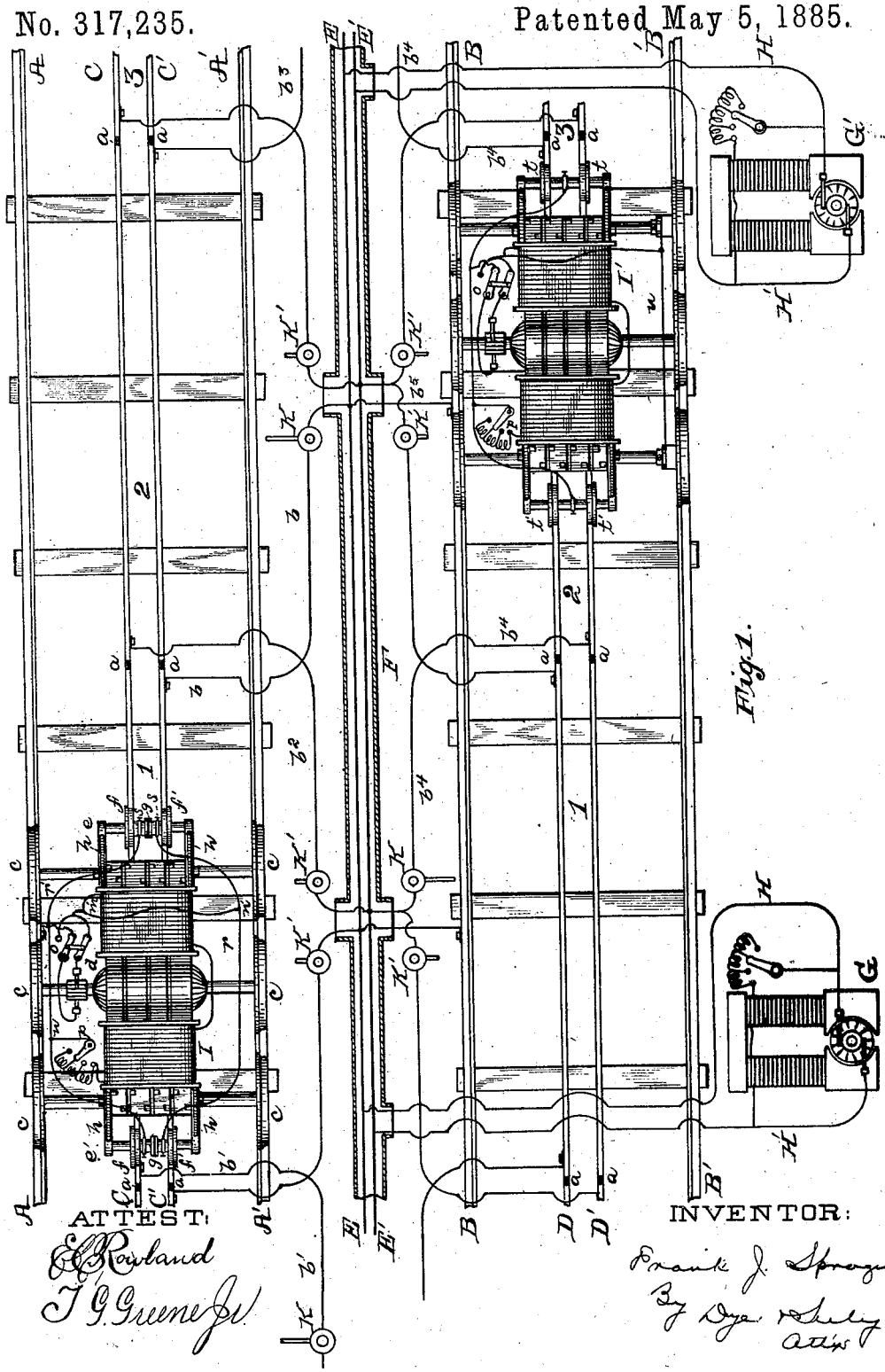

In Fig. 8, $w'$ is an elastic cushion or buffer placed on a rod, $v'$, which forms a part of the branch conductor. The rod passes through the working-conductors, and has upon it nuts $u'$ $u^2$, so that the conductor is constantly under tension from the elastic cushion and the slack is constantly taken up. The small spring $v^2$ permits the movement of the rod in adjusting it.

In Fig. 9, $t^2$ is a spring forming part of the working-conductor in the depression of block P. $s^2$ $s^2$ are pins for holding the conductor in the depression. The spring keeps the conductor under tension, and may be adjusted by turning the nut $r^2$.

As I employ two or more current-collectors in line for taking off the current, the depressions in the working-conductor do not interfere with the connection. This is illustrated in Fig. 10, which shows a different arrangement of the current-collectors from that shown in Fig. 1. Rollers $ff$, suitably attached to the motor through pivoted arms $p'p'$, travel on the working-conductor C. By means of adjustable spring $o'$ their pressure on the conductor is maintained.

Fig. 11 illustrates a mode of supporting and connecting a working-conductor. Conductor C is placed in grooves in insulating supporting-blocks, P'; or this may be a continuous string piece, and said conductor is connected with the main conductor in any suitable manner, such as I have already described. Diagrammatic connections are shown to a motor, I. In this case the rails are the return-circuit. Fig. 12 shows a similar arrangement of two conductors, forming a complete circuit. In this arrangement the current is preferably taken from the working-conductors by the device shown in Fig. 10, or one similar thereto.

Fig. 13 shows the working-conductors placed in side grooves in a block, P², for better protection from the weather. Current may be taken from them by horizontally-placed rollers, as will be well understood.

In Fig. 14 all the conductors are placed in a channel or trench, S, between the rails. The mains E E' are connected at convenient points with the working-conductors C C', which are here shown of bar form and placed upon insulating-support R. Figs. 15, 16 and 17 illustrate different forms of such bar conductors. When the working-conductors are beneath the ground, the arms which carry the current-collectors are, of course, extended to a sufficient length to reach the same.

I am aware of British Letters Patent No. 783 of 1881, in which continuous main conductors are connected to conductors from which the motor derives current by the passage of the motor upon the different sections of such conductors. In my system, however, the main conductors are normally connected with the working-conductors, whereby the complicated apparatus employed for closing circuit on the passage of a train is dispensed with. I am aware also of German Patent No. 18,901 of 1881.

I do not claim the feature herein set forth of supplying a double track or two sets of working-conductors from the same main circuit, since I propose to claim this in a separate application; and I do not claim herein a working-conductor placed above ground and having a shield above it for protecting it from the weather, since this also will be made the subject of a separate application.

What I claim is—

1. In an electric-railway system, the combination, with a working-conductor from which the motor derives current, of a main conductor normally connected at intervals with said working-conductor, substantially as set forth.

2. In an electric-railway system, the combination, with a working-conductor divided into sections, of a main conductor normally connected with each of said sections, substantially as set forth.

3. In an electric-railway system, the combination of continuous main conductors and working-conductors normally connected with said main conductors, from which working-conductors the current is taken by the motors, substantially as set forth.

4. In an electric-railway system, the combination of continuous main conductors and a working conductor or conductors divided electrically into sections, each section being normally connected with the main conductors, substantially as set forth.

5. In an electric-railway system, the combination of continuous main conductors and two working-conductors each divided electrically into sections, each of said sections being normally connected with the main conductors, substantially as set forth.

6. In an electric-railway system, the combination of continuous main conductors, working-conductors one or both of which are divided into sections, normal connections from the main conductors to the working-circuit sections, and a motor or motors, each motor having one terminal connected with one of the working-conductors, whereby circuit is completed from the main conductors through the working-conductors and the motor or motors, substantially as set forth.

7. In an electric-railway system, the combination of the main conductors, the separate working-circuits normally connected therewith, and one or more electrically-operated signaling devices in each of said working-circuits, substantially as set forth.

8. In an electric-railway system, the combination of continuous main conductors, working-conductors divided into sections, branch conductors normally connecting the main conductors with the working-conductor sections, and electrical signaling devices operated or controlled by the current in said branch conductors, substantially as set forth.

9. In an electric-railway system, the combination of the main or traffic rails, one or more intermediate rails divided into sections, continuous main conductors normally connected with each of said sections, and a motor mounted upon a car traveling upon said traffic-rails and provided with suitable current-collecting devices bearing upon said intermediate rail or rails, substantially as set forth.

10. In an electric-railway system, the combination, with a conductor from which the motors derive current, of tension-maintaining devices therefor situated out of the line of continuity of the conductor, substantially as set forth.

11. In an electric-railway system of the character described, the combination of a continuous main conductor placed under ground, a working-conductor placed above ground, and one or more branch conductors extending from said main conductor and normally connected with said working-conductor, substantially as set forth.

FRANK J. SPRAGUE.

Witnesses:
ROBB MACKIE,
EDWD. H. JOHNSON.

It is hereby certified that in Letters Patent No. 317,235, granted May 5, 1885, upon the application of Frank J. Sprague, of North Adams, Massachusetts, for an improvement in "Electric Railways," the following correction should be read: In lines 127, 128, and 129, page 3, of the printed specification the words, "I am aware also of German Patent No. 18,901, of 1881;" should be omitted, and the Letters Patent should be read without this sentence to make it conform to the record of the case in the Patent Office.

Signed, countersigned, and sealed this 19th day of May, A. D. 1885.

[SEAL.]

H. L. MULDROW,
*Acting Secretary of the Interior.*

Countersigned:
M. V. MONTGOMERY,
*Commissioner of Patents.*